(12) United States Patent
Wisniewski et al.

(10) Patent No.: US 9,830,333 B1
(45) Date of Patent: Nov. 28, 2017

(54) DETERMINISTIC DATA REPLICATION WITH CONFLICT RESOLUTION

(71) Applicant: Amazon Technologies, Inc., Reno, NV (US)

(72) Inventors: Scott Daniel Wisniewski, Edmonds, WA (US); Donald Erik Schneider, Kirkland, WA (US); Mathew Persons Jack, Seattle, WA (US); Ajay Kumar Sarda, Seattle, WA (US); Timothy Zelinsky, Seattle, WA (US); Philip Daniel Piwonka, Seattle, WA (US); Jeetendra Mirchandani, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 639 days.

(21) Appl. No.: 14/318,159

(22) Filed: Jun. 27, 2014

(51) Int. Cl.
*G06F 7/00* (2006.01)
*G06F 17/00* (2006.01)
*G06F 17/30* (2006.01)
*G06F 13/14* (2006.01)

(52) U.S. Cl.
CPC ............................ *G06F 17/30194* (2013.01)

(58) Field of Classification Search
CPC ......... G06F 17/30575; G06F 17/30578; G06F 17/30581; G06F 11/1451; G06F 11/1469; G06F 12/0646; G06F 12/0813; G06F 17/30215; G06F 17/30339; G06F 17/30368
USPC ........ 707/615, 626, 679, 758, E17.005, 613, 707/634, 999.2, E17.032, 618, 625, 707/999.01, 999.202, 999.203
See application file for complete search history.

(56) References Cited

U.S. PATENT DOCUMENTS

| | | | |
|---|---|---|---|
| 7,899,998 B1 * | 3/2011 | Katzer | ............... G06F 11/2097 711/151 |
| 2008/0052322 A1 * | 2/2008 | Gusciora | ........... G06F 17/30575 |

* cited by examiner

*Primary Examiner* — Heather Herndon
*Assistant Examiner* — Cecile Vo
(74) *Attorney, Agent, or Firm* — Eversheds Sutherland (US) LLP

(57) ABSTRACT

This disclosure relates to a geographically distributed, multi-master system for storing data records, and associated methods and computer-readable media for replicating data records across geographically distributed data stores of the system in a manner that achieves consistency between data stored in geographically distributed regions as well as deterministic data replication.

20 Claims, 8 Drawing Sheets

DETERMINISTIC DATA REPLICATION WITH CONFLICT RESOLUTION

BACKGROUND

Since their initial introduction about a decade or so ago, social networking services have increased in number, scope, and complexity. A social networking service may be any platform that facilitates the creation and maintenance of social networks or social relations among people who share interests, activities, backgrounds, real-world connections, or the like. With the increasingly global reach of many social networking services, it is not uncommon for members of a social networking service to establish connections with members from around the world. Platforms that support social networking services having a global reach may include data stores distributed across multiple geographic regions.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
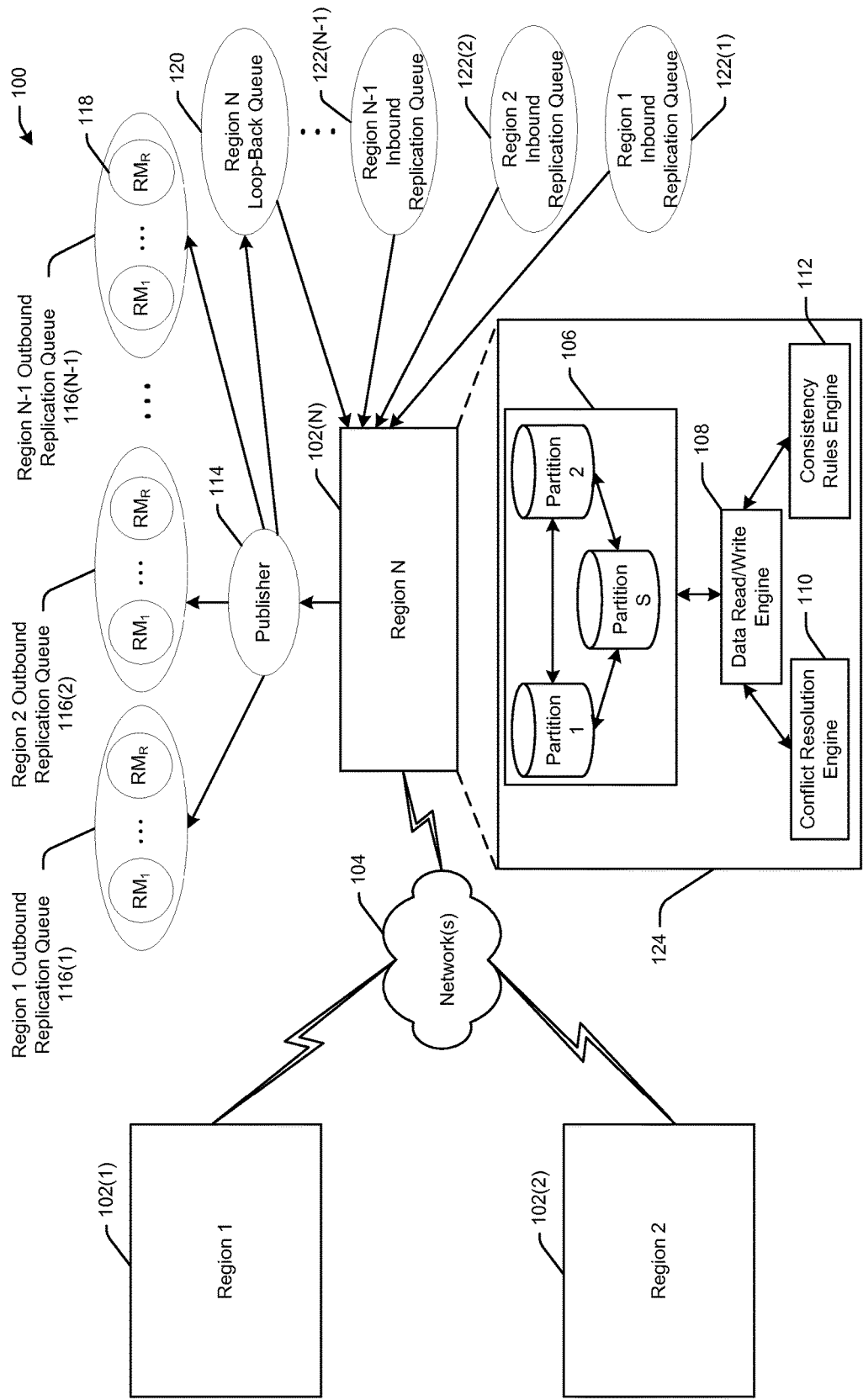
FIG. 1 is a schematic block diagram of an illustrative system architecture in accordance with one or more example embodiments of the disclosure.

This disclosure relates to, among other things, a geographically distributed, multi-master system for storing data records, and methods, computer-readable media, techniques, and methodologies for replicating data records across geographically distributed data stores of the system in a manner that achieves consistency between data stored in geographically distributed regions and determinism despite the possibility of concurrent data writes to the same or different objects in the geographically distributed regions. While example embodiments of the disclosure may be described in the context of the storage and replication of social networking data, it should be appreciated that embodiments of the disclosure are not limited to any particular type of data or operational context.

In an example embodiment of the disclosure, a data sharing platform (e.g., a social networking platform) may include data centers distributed across multiple geographic regions. Each data center may serve a particular subset of users of the platform. Each data center may include one or more servers or other computing devices, one or more networking devices, one or more data stores, and so forth. Data (e.g., social networking data) relating to users associated with a particular region (e.g., users accessing the platform from North America) may be written to and/or read from data stores located in the data center that serves that region.

By storing data in relative proximity to locations from which users access the data, a lower latency for data read/writes may be achieved, and the users may be provided with an improved customer experience. In the case of a global social networking platform, however, connections between users may span different geographies. For example, a user based in the United States may have established a connection with a user based in Europe. This connection may be modeled, for example, as an edge connecting two objects, with one object representing the user in the United States and the other object representing the user in Europe. If the edge (e.g., data relating to the connection between the two users, data relating to the user in the United States, or data relating to the user in Europe) was stored in only one geographic region, then one user may be provided with a relatively poor customer experience. For example, if the edge was stored only in the United States, then the user in Europe may be required to communicate with a data center located in the United States to obtain information relating to the user in the United States or information relating to the connection between the two users. As discussed above, this may involve higher latency and lower transmission speeds than if the data was stored in closer proximity to the user in Europe.

In addition, storing data, such as social networking data, in a single geographic region may also present data availability issues. For example, if a data center that serves the United States experiences an outage and data relating to users in the United States served by that data center is not stored in other data centers in other geographic regions, users in those other geographic regions may be unable to access data relating to users in the United States. Thus, failure to replicate data across multiple geographically distributed regions may cause an outage in any particular region to result in an outage for all regions (at least with respect to data stored in the region that experienced the outage). In contrast, replicating data across geographically distributed regions, allows users in regions that have not experienced an outage to continue to access and update the data.

Embodiments of the disclosure relate to a geographically distributed, multi-master system, and associated methods, computer-readable media, and techniques, for replicating data across multiple geographically distributed data stores of the system in a manner that ensures that consistent data is accessed by users regardless of the geographic region in which the data is stored and from which the data is accessed. In certain example embodiments of the disclosure, the final at-rest value determined for a data object in any particular region may account for concurrent updates made to the data object in other regions in such a manner that the final at-rest value for the data object after all updates have been replicated is the same regardless of the region that computes the final value. More specifically, conflict resolution techniques may be employed to resolve any conflicts between values for a data object and ensure that the final at-rest value for the data object after all updates have been replicated is identical across all regions. Such conflicts may occur as a result of concurrent updates made to a data object in different geographic regions.

Two updates may occur "concurrently" if, for example, a first update occurs in a first geographic region before a second update occurring in a second geographic region is replicated to the first geographic region. Thus, updates may occur concurrently even if the updates do not occur at the same time. For any particular data object, the number of concurrent updates that may be made to the data object may be proportional to the number of geographic regions in which the data object is stored.

Embodiments of the disclosure further achieve deterministic data replication that ensures that any particular data object achieves the same at-rest value after all updates have been replicated regardless of the order in which the updates may occur. The term "data object" may refer to one or more data values associated with and identifiable by the same identifier (e.g., a database key). The terms "data object" and "data record" may, at times, be used interchangeably herein.

In accordance with example embodiments of the disclosure, a geographically distributed, multi-master system may include multiple sub-systems, with each sub-system being provided at a data center that serves a distinct geographic region. As an illustrative and non-limiting example, the system may include a sub-system located in the United States that perhaps serves users located in North America (the NA region), a sub-system located in Europe that perhaps serves users located throughout Europe (the EU region), and a data center located in Asia (e.g., Japan) or a western portion of the United States that perhaps serves users located in various parts of Asia (the FE, or far-east, region). An update to a data object stored in a sub-system located in a data center that serves a particular region may, at times, may be referred to as an update that occurs at the particular region.

A sub-system associated with a particular region (e.g., the NA region) may include any number of components. For example, a sub-system may include a data store. In certain example embodiments, the data store may be a cluster of partitioned databases. Each partition (node) in the cluster may be redundant and may replicate data with at least a subset of its peers via, for example, a gossip protocol or the like.

Any given data record stored in one or more database partitions may be mathematically modeled as a tuple (k, c, v) where k may denote the data record's primary key, c may denote a vector clock associated with the data record, and v may denote that data record's value. The primary key k may serve as an identifier of a data object to which the data record relates. The value v may include one or more values assigned to one or more variables representative of attributes of a data object.

The vector clock c may be an associative array, a vector, or any other suitable data structure that includes a set of one or more attribute-value pairs. For example, in certain example embodiments of the disclosure, the vector clock c may be represented as a Javascript Object Notation (JSON) map as follows: {NA: 2, EU: 4, JP: 0}. In certain example embodiments, the vector clock c may be stored in physical disk storage as an array of integers, with each region having a fixed array-offset. Any suitable number of bytes may be utilized to represent each integer (e.g., 8-byte integers) of the vector clock c. Further compression of the on-disk representation of the vector clock c may be achieved through variable length integer encoding or the like. Moreover, in certain example embodiments, a single vector clock entry may be stored for each data object per geographic region regardless of the number of database partitions present in the region and regardless of the number of such partitions storing data records relating to the data object. This may be feasible because a single node (partition) may be permitted to write to or update a given data object. A meta clock, as used herein, refers to a vector clock that has only one vector clock entry per geographic region.

A sub-system of a geographically distributed, multi-master system in accordance with example embodiments of the disclosure may further include a data read/write engine, a conflict resolution engine, and a consistency rules engine, any of which may be implemented in any combination of hardware, firmware, and/or software. The data read/write engine may be configured to write data to and/or read data from one or more database partitions. In certain example embodiments, multiple data read/write engines may be provided. For example, a respective data read/write engine may be provided for each database partition. The conflict resolution engine may be configured to resolve conflicts between data records that may result, for example, from concurrent updates made to a data object in multiple geographic regions (e.g., multiple sub-systems). The consistency rules engine may be configured to enforce consistency rules across multiple objects to ensure that updates to different data objects do not result in inconsistent or illegal states.

A sub-system may additionally include a publisher component that may be configured to broadcast data replication messages to other sub-systems provided at other geographic regions. A replication message may include information relating to updates made to one or more data records (insertion of a data record may be referred to herein as an update). A replication message may be generated, for example, in response to an update to a data object (e.g., updating a value associated with an existing data record, writing a new data record, etc.). A replication message may include an identifier (e.g., a primary key) associated with a data record, a vector clock associated with the data record, and one or more updated values for the data record. In certain example embodiments, in addition to information relating to a particular data object, a replication message may further include keys and associated vector clocks (and optionally updated values) for any other data objects that were evaluated (or updated) as a result of application of consistency rules in response to the update to the particular data object.

In certain example embodiments, inbound and outbound replication message queues may be provided for conveying replication messages between a source sub-system and a destination sub-system. In certain example embodiments, a respective inbound message queue may be provided for each pair of different geographic regions. Each inbound message queue may also be an outbound message queue. For example, an inbound message queue via which the NA region receives replication messages from the EU region may also be an outbound message queue via which the EU region communicates replication messages to the NA region. A sub-system at a particular geographic region may retrieve replication messages from various other geographic regions via corresponding inbound message queues and may replicate updates identified in the replication messages to one or more database partitions of the sub-system. The replication messages retrieved from the inbound queues may have been generated and published to the queues by other sub-systems corresponding to other geographic regions responsive to generation of the updates by the other sub-systems. Thus, through the use of message queues, updates in one geographic region may be replicated to other geographic regions asynchronously without the need for a distributed transaction coordinator or the like.

In addition, in various example embodiments, a loop-back queue may be provided for each region. A loop-back queue may convey replication messages generated by a particular sub-system back to that sub-system for replication to one or more other database partitions. A loop-back queue may be utilized, among other things, to facilitate cross-partition updates if data objects are stored on multiple partitions. An illustrative scenario to which cross-partition updates may be applicable may involve the storage of edges and associated attributes. For example, both incoming and outgoing edges corresponding to a node may be stored on a same partition. The node may be representative, for example, of a user. Thus, if user A has established a connection with user B, an edge representing the connection between user A and user B may be stored in both a first partition in which a node corresponding to user A is stored and a second partition in which a node corresponding to user B is stored. In such an example scenario, a loop-back queue may be used to facilitate the replication of an update made to the edge between user A and user B stored in the first partition to the edge stored in the second partition. Cross-partition updates and the use of loop-back message queues to facilitate such updates will be discussed in more detail later in this disclosure.

Utilizing the example introduced above in which three geographic regions are present (e.g., the NA region, the EU region, and the FE region), the following inbound/outbound replication message queues may be provided (the region listed first represents the source of the replication message and the region listed second represents the destination): (NA_to_EU), (NA_to_FE), (EU_to_NA), (FE_to_NA), (EU_to_FE), and (FE_to_EU). In addition, the following loop-back queues may be provided: (NA_to_NA), (EU_to_EU), and (FE_to_FE). The example geographic regions discussed above may be effectively connected in a star topology via the inbound/outbound message queues. Each region may utilize a push notification service or the like to define a topic, and each other geographic region may subscribe to the topic via a corresponding message queue. In this manner, a respective outbound queue may be generated to push replication messages generated by the region that defined the topic to each region that subscribed to the topic. Each such outbound queue may thus be an inbound queue via which the subscribing geographic region may receive replication messages from the region that defined the topic.

In certain example embodiments, the inbound/outbound message queues may utilize an "at least once" delivery model that may guarantee delivery of a replication message, but which may not guarantee that a replication message will be retrieved from a queue and read in the order in which it was inserted or that a replication message will not be delivered multiple times. Accordingly, as will be described in more detail hereinafter, the use and inclusion of vector clocks in replication messages; ensuring that conflict resolution operations for resolving data record conflicts have certain attributes; the inclusion of data records for related objects in replication messages; and/or soft deletes may serve to ensure eventual consistency and/or determinism despite the use of an "at least once" delivery model.

A soft delete may refer to a delete operation that does not permanently delete a data record, but which may store a portion of the data record in a separate database table or the like. The portion of the data record that is stored may include the record's key and its vector clock. The value of the data record may not be stored. As such, a soft delete may be thought of as an update in combination with a delete flag. Storing a deleted record's vector clock allows a sub-system to arrive at the correct at-rest value for the record's key despite the possibility of out-of-order delivery of replication messages.

For example, if a data record is deleted and then inserted in a first geographic region, replication messages for the delete and insertion may be generated and inserted into outbound queues in the order in which the operations occurred. Because, however, the replication messages may be delivered out-of-order, a second geographic region may receive the insertion message prior to receiving the delete message. If a permanent delete operation is used in lieu of a soft delete operation, execution of the delete operation may result in the data record ceasing to exist in the second geographic region and existing in the first geographic region. Thus, a soft delete operation may serve to ensure, at least in part, eventual consistency and/or deterministic data replication.

As previously noted, various conflict resolution operations may be employed to resolve conflicts between data records and ensure data consistency across geographic regions. As an illustrative and non-limiting example, a first data record may be stored in a first data store provided at a first geographic region. It should be appreciated that the first data record may be written to a first partition of the data store and replicated to one or more other partitions to provide redundancy. As previously noted, the first data record may be modeled as a tuple including a first key (or other identifier), a first vector clock, and a first value. A replication message containing a second data record may be retrieved from an inbound message queue. A sub-system provided at a second geographic region may have generated the replication message and inserted it into the queue in response to performing an update reflected by the second data record. The second data record may also be modeled as a tuple including a second key (or other identifier), a second vector clock, and a second value. While singular terminology may be used herein to describe a value of a data record, such terminology is utilized solely for ease of explanation. It should be appreciated that a data record may include or otherwise be associated with multiple values.

If it is determined that the first key and the second key are equivalent, and thus, that the first data record and the second data record correspond to the same data object, the first vector clock and the second vector clock may be compared to determine whether the first data record and the second data record conflict. More specifically, a number of operations may be defined on vector clocks. These operations may be utilized to perform the comparison of the first vector clock and the second vector clock. These vector clock operations will be described in more detail later in this disclosure.

If the first data record and the second data record are determined to conflict based on the comparison of their respective vector clocks, one or more conflict resolution operations may be performed to resolve the conflict. As previously noted, two data records may conflict as a result of concurrent updates made to the data records in different geographic regions. In certain example embodiments, the conflict resolution operations may include applying a conflict resolution function to at least the first value and the second value to generate a resolved value. The first value may then be overwritten with the resolved value. The conflict resolution function may satisfy the associative and commutative properties in order to, for example, ensure eventual consistency. In addition, the conflict resolution function may guarantee determinism by arriving at the same resolved value regardless of the order in which data record updates may occur. The conflict resolution operations may further include generating a new vector clock (e.g., a least upper bound vector clock) based at least in part on the first vector clock and the second vector clock. The first vector clock may then be overwritten with the new vector clock. The conflict resolution operations will be described in more detail later in this disclosure.

The use of vector clocks and conflict resolution operations may provide determinism for concurrent updates to a given data object, but may not ensure that concurrent updates to different data objects do not result in an illegal or inconsistent state. A particular state of one or more data objects may be determined to be illegal or inconsistent if the state violates one or more business rules. As such, embodiments of the disclosure further provide for the application of consistency rules to ensure that data object updates do not result in an illegal or inconsistent state. The use of consistency rules in accordance with various example embodiments of the disclosure will be described in more detail later in this disclosure.

Example embodiments of the disclosure provide a number of advantages and/or technical effects. For example, the application of conflict resolution operations and consistency rules ensure eventual data consistency and deterministic data replication for data object updates that may occur in a globally replicated, geographically distributed, multi-master data store system in accordance with example embodiments of the disclosure, even if the updates are made concurrently to different data objects. In addition, eventual consistency and/or deterministic data replication is achieved without cross-region synchronization. More specifically, no other communication between sub-systems provided at different geographic regions may be required (other than the exchange of replication messages) in order to ensure eventual data consistency and/or determinism.

In addition, eventual data consistency and/or determinism may be achieved without distributed transaction support or the presence of a distributed transaction coordinator. For example, the use of loop-back message queues and other features of the disclosure ensure eventual data consistency and/or determinism even for those data objects that may be written to multiple partitions. Still further, replication messages in accordance with example embodiments of the disclosure may include all data objects and associated vector clocks that may be needed to apply consistency rules, thereby enabling eventual consistency and determinism to be achieved without explicit coordination between sub-systems provided at different geographic regions or between partitions of a data store provided at a particular geographic region.

In addition, example embodiments of the disclosure may result in a significant reduction in storage overhead by exploiting the partitioned nature of a data store. In particular, a meta clock that includes a single vector clock entry for each geographic region may be stored in association with a data object rather than multiple vector clock entries per region. This may be achievable by permitting a single node (partition) to update a given data object or, in those scenarios in which multiple nodes may update a given object (e.g., an edge), by providing a mechanism for cross-partition updates through the use of loop-back message queues.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. It should also be appreciated that the above examples of advantages and/or technical effects of example embodiments of the disclosure are merely illustrative and not exhaustive. The above-described embodiments and additional and/or alternative embodiments of the disclosure will be described in detail hereinafter through reference to the accompanying drawings.

Illustrative System Architecture

FIG. 1 is a schematic block diagram of an illustrative system architecture 100 in accordance with one or more example embodiments of the disclosure. The architecture 100 may include any number of data centers 102(1)-102(N), each of which may be designated to serve a particular geographic region. The data centers 102(1)-102(N) may support a data sharing platform such as, for example, a social networking platform. Each data center may serve a subset of users of the data sharing platform such as, for example, those users accessing the data center from the geographic region that the data center serves. While a data center may be described as being located within the geographic region that the data center serves, this may not always be the case. For example, a data center located in the in the United States (e.g., California, Hawaii, etc.) may serve users located in parts of Asia. In addition, a data center may serve a particular geographic region by, for example, writing data received from user devices accessing the platform from within the geographic region to one or more data stores provided at the data center and/or reading data from the data store(s) and transmitting the read data to a user device in response to a request for the data received from the user device.

Each data center may include a sub-system forming part of a geographically distributed, multi-master data store system in accordance with example embodiments of the disclosure. Each sub-system corresponding to a particular geographic region may be configured to communicate via one or more networks 104. Such networks may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks.

Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

An illustrative sub-system 124 associated with the data center 102(N) that serves geographic region N is depicted in FIG. 1. The sub-system 124 may include a data store 106, a data read/write engine 108, a conflict resolution engine 110, and a consistency rules engine 112, any of which may be implemented in any combination of hardware, firmware, and/or software. In certain example embodiments, the data store 106 may comprise a cluster of database partitions 1-S. The cluster of database partitions may be stored on one or more storage devices (not shown) and may be accessible by one or more computing devices (not shown).

One or more partitions (also referred to herein, at times, as "database nodes" or "partition nodes") in the cluster may store redundant data. More specifically, any given partition may have authority to update one or more data objects stored on that partition. For example, one or more data objects stored on a partition may be designated as being "owned" by that partition. A partition may be provided with the authority to update those data objects "owned" by the partition and may be prevented from updating those data objects not "owned" by the partition. While a database partition may be described as having authority to update data objects that it "owns," in certain example embodiments, this may actually refer to the capability of a computing device accessing a partition to update those data objects "owned" by the partition.

A partition with the authority to update a data object may replicate the update to any number of additional partitions. In certain example embodiments, a partition may replicate its updates to three other nodes. It should be appreciated, however, that the level of redundancy provided is a tunable parameter, and thus, a given partition may replicate its updates to any number of additional partitions depending on the level of redundancy that is desired. A partition may replicate its data object updates via any suitable protocol such as, for example, a gossip protocol or the like. Consistent hashing or any other suitable technique may be used to route requests for a data record to the partition that "owns" the data record. In addition, upon failure of a database partition, the partition may be replaced by a replica partition having the same permission levels as the failed database partition.

In certain example embodiments, data object updates may be scoped to a single partition per sub-system, e.g., per geographic region. Stated another way, for any given data object, a single respective partition may be provided with the authority to write to the data object. As such, for each data object, a single vector clock entry may be stored per geographic region. In other words, for a given data object A, the corresponding vector clock may include a single vector clock entry corresponding to Region 1, a single vector clock entry corresponding to Region 2, and so forth. Such vector clocks may be referred to herein as meta clocks.

In other example embodiments, more than one partition may be permitted to write to a data object, e.g., more than one partition may "own" a data object. For example, certain data objects (e.g., edges representative of a connection between two user nodes) may be stored in multiple partitions (e.g., both of the partitions in which the user nodes are stored). This may permit both incoming and outgoing edges for a node to be queried more efficiently. Absent storing both incoming and outgoing edges for a node in the same partition, an entire cluster of database partitions may need to be queried in order to enumerate all incoming and outgoing edges for a node.

Despite the possibility that more than one partition may be permitted to write a data object, a vector clock for the data object may nonetheless include a single vector clock entry for each geographic region. This may be feasible by providing a mechanism for cross-partition updates in accordance with example embodiments of the disclosure. Such a mechanism may include ordering multiple partitions "owning" a data object (e.g., an edge representing a connection between two nodes) based at least in part on identifiers (e.g., keys) of the two nodes. A first partition storing a first node associated with the edge may be selected, based on the ordering, as a "canonical" partition for the edge. The first partition may be, for example, the partition storing the node identified by the lesser or the greater key. A second partition storing a second node associated with the edge may thus become the "non-canonical" partition for the edge. Any updates to the edge may first be attempted to be committed to the canonical partition before committing the update to the non-canonical partition. Prior to attempting to commit an update to the canonical partition, a replication message may be generated for the update and inserted into a loop-back queue associated with the sub-system (and thus geographic region) to which the canonical and non-canonical partitions correspond. The update may be accessed from the loop-back queue and committed to the non-canonical partition. If the update does not commit successfully to the canonical partition within, for example, a predetermined period of time, the update to the non-canonical partition may be rolled-back. If the update does eventually commit to the canonical partition, publication of the update to the loop-back queue ensures that the update will eventually commit to the non-canonical partition. The cross-partition update mechanism described above ensures that eventual consistency is obtained across database partition even if multiple partitions "own" a particular data object.

As previously noted, the sub-system 124 may further include the data read/write engine 108, the conflict resolution engine 110, and the consistency rules engine 112. The data read/write engine 108 may be configured to write data to and/or read data from one or more of the database partitions 1-S. In certain example embodiments, multiple data read/write engines may be provided. For example, a respective data read/write engine may be provided for each database partition. The conflict resolution engine 110 may be configured to resolve conflicts between data records that may result, for example, from concurrent updates made to a data object in multiple geographic regions (e.g., multiple sub-systems). The consistency rules engine 112 may be configured to enforce consistency rules across multiple objects to ensure that updates to different data objects do not result in inconsistent or illegal states. The functionality supported by the conflict resolution engine 110 and the consistency rules engine 112 will be described in more detail later in this disclosure.

The sub-system 124 may additionally include a publisher engine or component 114 that may be configured to broadcast data replication messages $RM_1 \ldots RM_R$ to other sub-systems provided at other geographic regions. A replication message (RM) may include information relating to updates made to one or more data records (an update to a data record may include an insertion of a data record). An RM may be generated, for example, in response to an update to a data object (e.g., updating a value associated with an existing data record, writing a new data record, etc.). An RM may include an identifier (e.g., a primary key) associated with a data record, a vector clock associated with the data record, and one or more updated values for the data record. In certain example embodiments, in addition to information relating to a particular data object, an RM may further include keys and associated vector clocks (and optionally updated values) for any other data objects that were evaluated (or updated) as a result of application of consistency rules in response to the update to the particular data object.

The replication messages $RM_1 \ldots RM_R$ 118 may be published by the publisher 114 to various outbound replication queues 116(1)-116(N−1). A respective outbound replication queue may be provided to convey data object updates from the sub-system 124 corresponding to Region N to each respective sub-system corresponding to each other region (e.g., Regions 1 to (N−1)). While not depicted in FIG. 1, outbound replication queues may similarly be provided for each other geographic region. More specifically, an outbound replication queue may be provided for each ordered pair of geographic regions. Various inbound replication queues 122(1)-122(N−1) may also be provided for geographic region N. While not depicted in FIG. 1, inbound replication queues may similarly be provided for each other geographic region. More specifically, as with outbound replication queues, a respective inbound replication queue may be provided for each ordered pair of geographic regions.

More specifically, for each pair of geographic regions (e.g., geographic regions (N−1) and N), a first outbound replication queue may be provided for conveying updates made by the sub-system corresponding to geographic region (N−1) to a sub-system associated with geographic region N and a second outbound replication queue 116(N−1) may be provided for conveying updates made by the sub-system corresponding to geographic region N to the sub-system corresponding to geographic region N−1. Similarly, for each pair of geographic regions (e.g., geographic regions (N−1) and N), a first inbound replication queue 122(N−1) may be provided for receiving updates made by the sub-system corresponding to geographic region (N−1) by the sub-system associated with geographic region N and a second inbound replication queue may be provided for receiving updates made by the sub-system corresponding to geographic region N by the sub-system corresponding to geographic region (N−1). In certain example embodiments, each outbound replication queue for conveying updates from region A to region B may be the same queue as the inbound replication queue for receiving, by region A, updates from region B. In other words, the first outbound replication queue discussed above may be the same queue as inbound replication queue 122(N−1) and the second inbound replication queue may be the same queue as the outbound replication queue 116(N−1).

A sub-system corresponding to a particular geographic region may receive replication messages from sub-systems corresponding to various other geographic regions via corresponding inbound replication queues and may replicate updates identified in the replication messages to one or more database partitions of the sub-system. Similarly, a sub-system corresponding to a particular geographic region may publish updates to sub-systems corresponding to other geographic regions via corresponding outbound replication queues, and such other sub-systems may replicate the updates. Thus, through the use of replication queues, updates in one geographic region may be replicated to other geographic regions asynchronously without the need for a distributed transaction coordinator or the like.

In addition, in various example embodiments, a loop-back queue 120 may be provided for geographic region N. A respective loop-back queue may similarly be provided for each other geographic region. The loop-back queue 120 may convey replication messages generated by the sub-system 124 back to that sub-system for replication to one or more database partitions 1-S other than a partition to which the update was made. As previously described, a loop-back queue may be utilized, among other things, to facilitate cross-partition updates if data objects are stored on multiple partitions.

Figure 2:
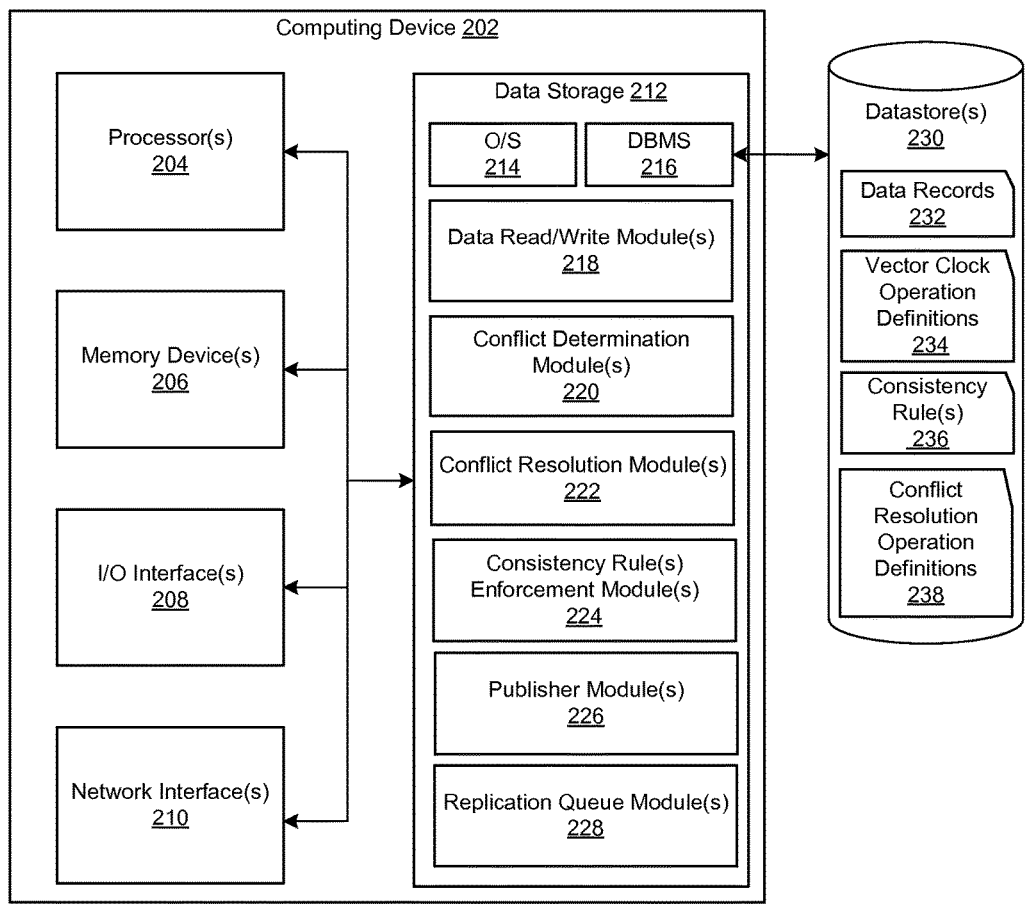
FIG. 2 is a schematic block diagram of an illustrative computing device configured for operation as part of the illustrative system architecture depicted in FIG. 1 in accordance with one or more example embodiments of the disclosure.

FIG. 2 is a schematic block diagram of an illustrative computing device 202 configured for operation as part of the illustrative system architecture 100 depicted in FIG. 1 in accordance with one or more example embodiments of the disclosure. It should be appreciated that FIG. 2 merely depicts an illustrative configuration for the computing device 202 and that numerous other alternate configurations comprising more, less, or different hardware, firmware, or software components are within the scope of this disclosure. In certain example embodiments, the computing device 202 may form part of a sub-system (e.g., sub-system 124) corresponding to a particular geographic region. Further, in certain example embodiments, functionality described as being supported by the device 202 may be distributed across multiple devices.

In an illustrative configuration, the computing device 202 may include one or more processors (processor(s)) 204, one or more memory devices 206 (generically referred to herein as memory 206), one or more input/output ("I/O") interface(s) 208, one or more network interfaces 210, and data storage 212. These various components will be described in more detail hereinafter.

The memory 206 of the computing device 202 may include volatile memory (memory that maintains its state when supplied with power) such as various forms of random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 206 may include multiple different types of memory, such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 206 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 212 may include removable storage and/or non-removable storage including, but not limited to, magnetic storage, optical disk storage, and/or tape storage. The data storage 212 may provide non-volatile storage of computer-executable instructions and other data. The data storage 212 may include storage that is internal and/or external to the computing device 202. The memory 206 and the data storage 212, removable and/or non-removable, are examples of computer-readable storage media (CRSM) as that term is used herein.

The data storage 212 may store computer-executable code, instructions, or the like that may be loadable into the memory 206 and executable by the processor(s) 204 to cause various operations to be performed. The data storage 212 may additionally store data that may be copied to memory 206 for use by the processor(s) 204 during the execution of the computer-executable instructions. Moreover, output data generated as a result of execution of the computer-executable instructions by the processor(s) 204 may be stored initially in memory 206, and may ultimately be copied to data storage 212 for non-volatile storage.

More specifically, the data storage 212 may store one or more operating systems (O/S) 214; one or more database management systems (DBMS) 216; and one or more program modules, applications, or the like such as, for example, one or more data read/write module(s) 218, one or more conflict determination module(s) 220, one or more conflict resolution module(s) 222, one or more consistency rule(s) enforcement module(s) 224, one or more publisher module(s) 226, one or more replication queue module(s) 228, and so forth. Each of the program modules depicted in FIG. 2 may include computer-executable code, instructions, or the like that responsive to execution by one or more of the processor(s) 204 may cause respective operations to be performed.

The data read/write module(s) 218 may include computer-executable code, instructions, or the like that responsive to execution by one or more of the processor(s) 204 may cause one or more database partitions to be written to or read from. More particularly, the data read/write module(s) 218 may support functionality for updating one or more data objects stored in a data store (e.g., a partition of a cluster of partitioned databases) and replicating the updates to one or more other database partitions.

The conflict determination module(s) 220 may include computer-executable code, instructions, or the like that responsive to execution by one or more of the processor(s) 204 may cause determinations to be made as to whether a conflict exists between data records. The conflict resolution module(s) 222 may include computer-executable code, instructions, or the like that responsive to execution by one or more of the processor(s) 204 may cause one or more conflict resolution operations to be performed to resolve a detected conflict between data records.

The consistency rules enforcement module(s) 224 may include computer-executable code, instructions, or the like that responsive to execution by one or more of the processor(s) 204 may cause one or more consistency rules to be evaluated/applied responsive to a data object update in order to ensure that the update does not result in an illegal or inconsistent state for the data object. Application of the consistency rules may include evaluating one or more related data objects.

The publisher module(s) 226 may include computer-executable code, instructions, or the like that responsive to execution by one or more of the processor(s) 204 may cause replication messages generated by a sub-system corresponding to a particular geographic region to be inserted into outbound replication queues associated with other geographic regions. The publisher module(s) 226 may further support functionality for publishing replication messages to a loop-back queue.

The replication queue module(s) 228 may include computer-executable code, instructions, or the like for generating replication messages containing information pertaining to data object updates made by a sub-system corresponding to a particular geographic region, generating outbound replication queues to facilitate transmission of the replication messages to other geographic regions in order to enable replication of the data object updates by sub-systems corresponding to other geographic regions, retrieving, from inbound replication queues, replication messages containing information pertaining to data object updates made by sub-systems corresponding to other geographic regions, and so forth.

While the program modules are depicted as modules stored in the data storage 212, any of the program modules may be implemented in any combination of hardware, firmware, or software. In certain example embodiments, the data read/write module(s) 218 may form at least part of the data read/write engine 108. Similarly, the conflict determination module(s) 220 and the conflict resolution module(s) 222 may form at least part of the conflict resolution engine 110, the consistency rules enforcement module(s) 224 may form at least part of the consistency rules engine 112, and the publisher module(s) 226 may form at least part of the publisher 114. The functionality supported by each of the modules depicted in FIG. 2 will be described in more detail through reference FIGS. 3-6.

One or more datastores 230 may be provided for storing any of a variety of types of data (including computer-executable code, instructions, or the like). The datastore(s) 230 may store data records 232, vector clock operation definitions 234, consistency rules 236, conflict resolution function definitions 238, and/or any other types of data. The datastore(s) 230 may include any suitable data repository including, but not limited to, databases (e.g., relational, object-oriented, etc.), file systems, flat files, distributed data stores in which data is stored on more than one node of a computer network, peer-to-peer network data stores, or the like. Any of the datastore(s) 230 may represent data in one or more data schemas. Any of the data (including any computer-executable code, instructions, or the like) illustratively depicted as being stored in the datastore(s) 230 may additionally, or alternatively, be stored in the memory 206 and/or the data storage 212.

The DBMS 216 may be loaded into the memory 206 and may support functionality for accessing, retrieving, storing, and/or manipulating data stored in one or more of the datastores 230, data stored in the memory 206, and/or data stored in the data storage 212. The DBMS 216 may use any of a variety of database models (e.g., relational model, object model, etc.) and may support any of a variety of query languages.

The O/S 214 may be loaded from the data storage 212 into the memory 206 and may provide an interface between other application software executing on the computing device 202 and hardware resources of computing device 202. More specifically, the O/S 214 may include a set of computer-executable instructions for managing hardware resources of the computing device 202 and for providing common services to other application programs (e.g., managing memory allocation among various application programs). The O/S 214 may include any operating system now known or which may be developed in the future including, but not limited to, any server operating system, any mainframe operating system, or any other proprietary or non-proprietary operating system.

Referring now to other illustrative components of the computing device 202, the processor(s) 204 may be configured to access the memory 206 and execute computer-executable instructions loaded therein. For example, the processor(s) 204 may be configured to execute computer-executable instructions of the various program modules of the computing device 202 to cause or facilitate various operations to be performed in accordance with one or more embodiments of the disclosure. The processor(s) 204 may include any suitable processing unit capable of accepting data as input, processing the input data in accordance with stored computer-executable instructions, and generating output data. The processor(s) 204 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 204 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 204 may be capable of supporting any of a variety of instruction sets.

The computing device 202 may further include one or more input/output (I/O) interfaces 208 that may facilitate the receipt of input information by the computing device 202 from one or more I/O devices as well as the output of information from the computing device 202 to the one or more I/O devices. The I/O devices may include, for example, one or more user interface devices that facilitate interaction between a user and the computing device 202 including, but not limited to, a display, a keypad, a pointing device, a control panel, a touch screen display, a remote control device, a microphone, a speaker, and so forth. The I/O devices may further include, for example, any number of peripheral devices such as data storage devices, printing devices, and so forth.

The computing device 202 may be configured to communicate with any of a variety of other systems, platforms, networks, devices, and so forth (e.g., an output device) via one or more of the network(s) 104. The computing device 202 may include one or more network interfaces 210 that may facilitate communication between the computing device 202 and any such systems, platforms, networks, or devices.

It should be appreciated that the program modules, applications, computer-executable instructions, code, or the like depicted in FIG. 2 as being stored in the data storage 212 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the computing device 202 and/or hosted on other computing device(s) accessible via one or more of the network(s) 104 may be provided to support functionality provided by the program modules, applications, or computer-executable code depicted in FIG. 2 and/or additional or alternate functionality. Further, functionality may be modularized differently such that processing described as being supported collectively by the collection of program modules depicted in FIG. 2 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 2 may be implemented, at least partially, in hardware and/or firmware across any number of devices.

It should further be appreciated that the computing device 202 may include alternate and/or additional hardware, software, or firmware components beyond those described or depicted without departing from the scope of the disclosure. More particularly, it should be appreciated that software, firmware, or hardware components depicted as forming part of the computing device 202 are merely illustrative and that some components may not be present or additional components may be provided in various embodiments. While various illustrative program modules have been depicted and described as software modules stored in data storage, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Illustrative Processes

Figure 3:
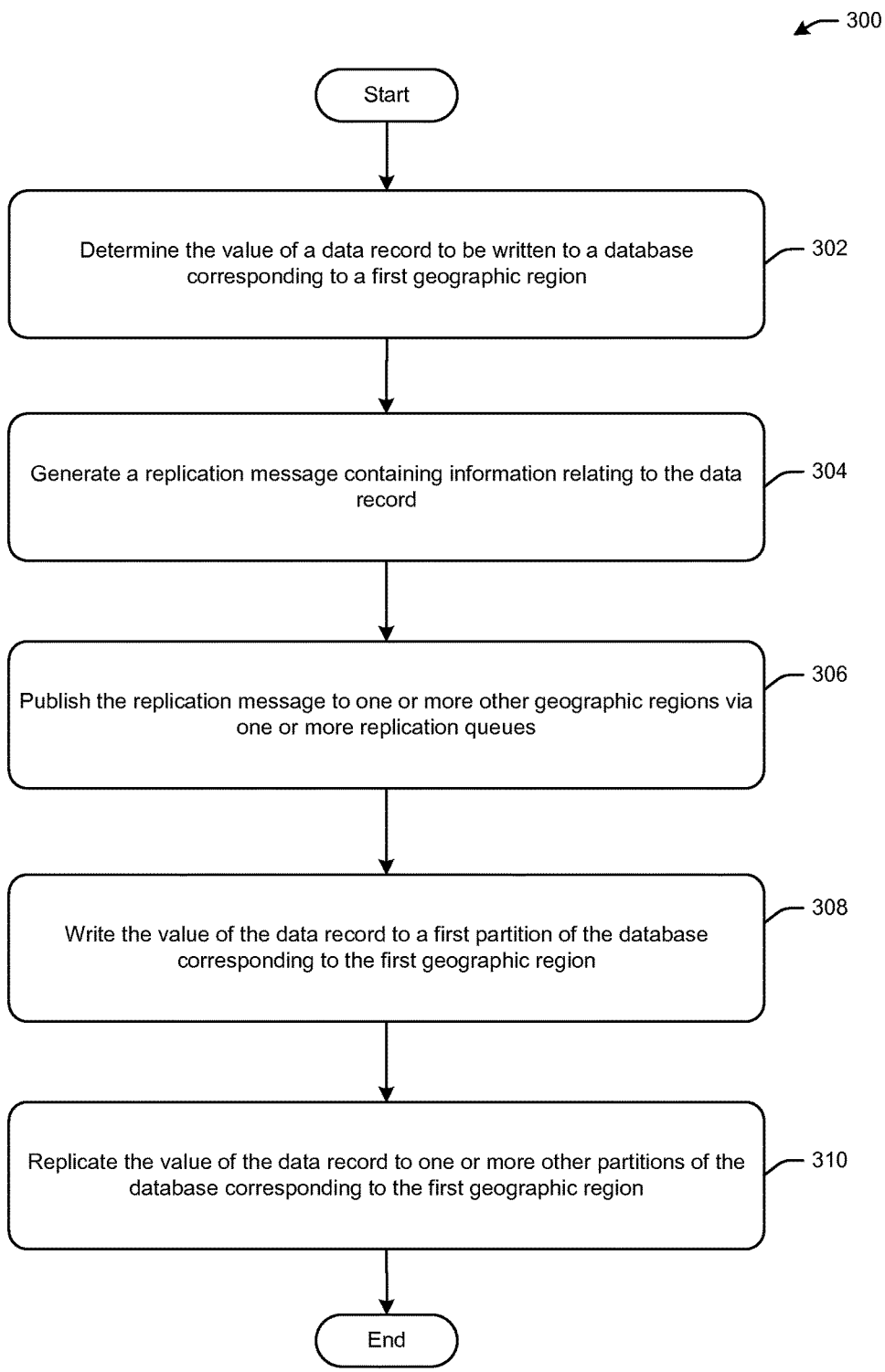
FIG. 3 is a process flow diagram of an illustrative method for writing a data record to a data store corresponding to a first geographic region and facilitating replication of the data record in data stores corresponding to one or more other geographic regions in accordance with one or more example embodiments of the disclosure.

FIG. 3 is a process flow diagram of an illustrative method 300 for writing a data record to a data store provided in a first geographic region and facilitating replication of the data record in data stores corresponding to one or more other geographic regions in accordance with one or more example embodiments of the disclosure.

At block 302, computer-executable instructions of the data read/write module(s) 218 may be executed to determine the value of a data record to be written to a database corresponding to a first geographic region.

At block 304, computer-executable instructions of the replication queue module(s) 228 may be executed to generate a replication message containing information relating to the data record to be written. The replication message may include an identifier of the data record (e.g., a key), a vector clock associated with the data record, and the value determined at block 302. The information included in the replication message may further include key(s), vector clocks, and optionally, values associated with one or more other data records related to the data record to be written. Such other data records may include data records evaluated as part of the application of consistency rules.

At block 306, computer-executable instructions of the publisher module(s) 226 may be executed to publish the replication message generated at block 304 to one or more other geographic regions via one or more outbound replication queues. In this manner, upon receipt of the replication message by a sub-system corresponding to another geographic region, that sub-system may replicate the data record based on the information included in the replication message.

At block 308, computer-executable instructions of the data read/write module(s) 218 may be executed to write the value of the data record to a first database partition of a cluster of database partitions corresponding to the first geographic region. The database cluster may form at least part of a data store (e.g., data store 106) which, in turn, may form at least part of a sub-system (e.g., sub-system 124) corresponding to a particular geographic region (e.g., Region N). Writing the value determined at block 302 may correspond to an update to an existing data record.

At block 310, computer-executable instructions of the data read/write module(s) 218 may be executed to replicate the value of the data record to one or more other database partitions in the cluster. The number of other database partitions to which the data record value may be replicated may be determined based on a desired level of redundancy. Any suitable protocol (e.g., a gossip protocol) may be employed to replicate the data record to one or more other partitions. It should be appreciated that the operations of blocks 308 and 310 are merely illustrative, and that in certain example embodiments, the data record may be written to a single, monolithic data store that does not comprise partitions.

Generation of a replication message that identifies an update to a data record in a first geographic region and publication of the replication message to one or more outbound replication queues prior to writing the update to a database in the first geographic region helps to ensure data consistency across geographic regions without the use of a distributed transaction coordination mechanism. For example, if database corresponding to the first geographic region reboots prior to fully committing the update, the replication message may be accessed in order to ensure that the update is fully committed. Thus, computer-executable code that processes replication queues may serve as a proxy for a distributed transaction coordinator.

Figure 4A:
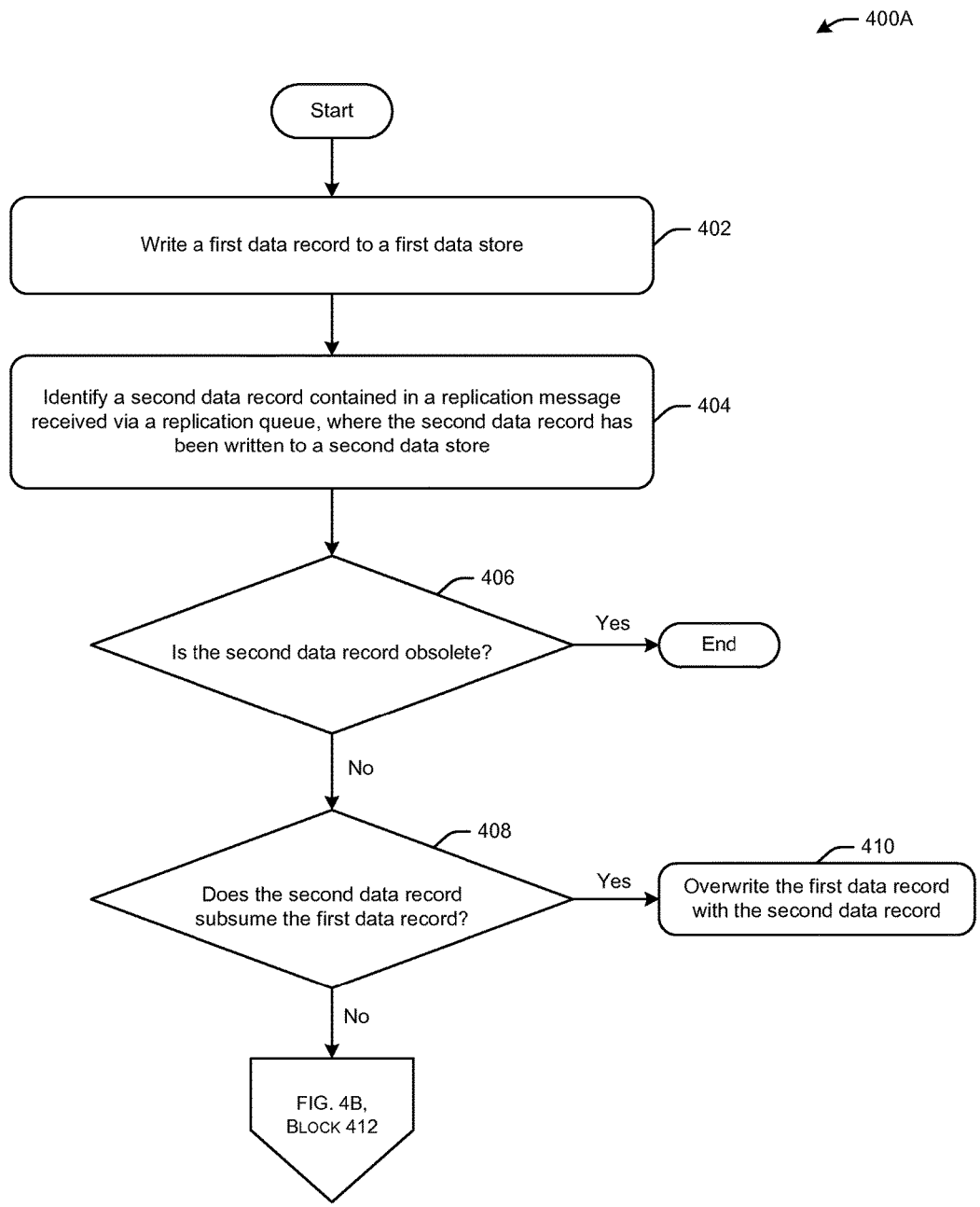
FIG. 4A is a process flow diagram of an illustrative method for determining whether a data record to be written to a data store conflicts with an existing stored data record in accordance with one or more example embodiments of the disclosure.
Figure 4B:
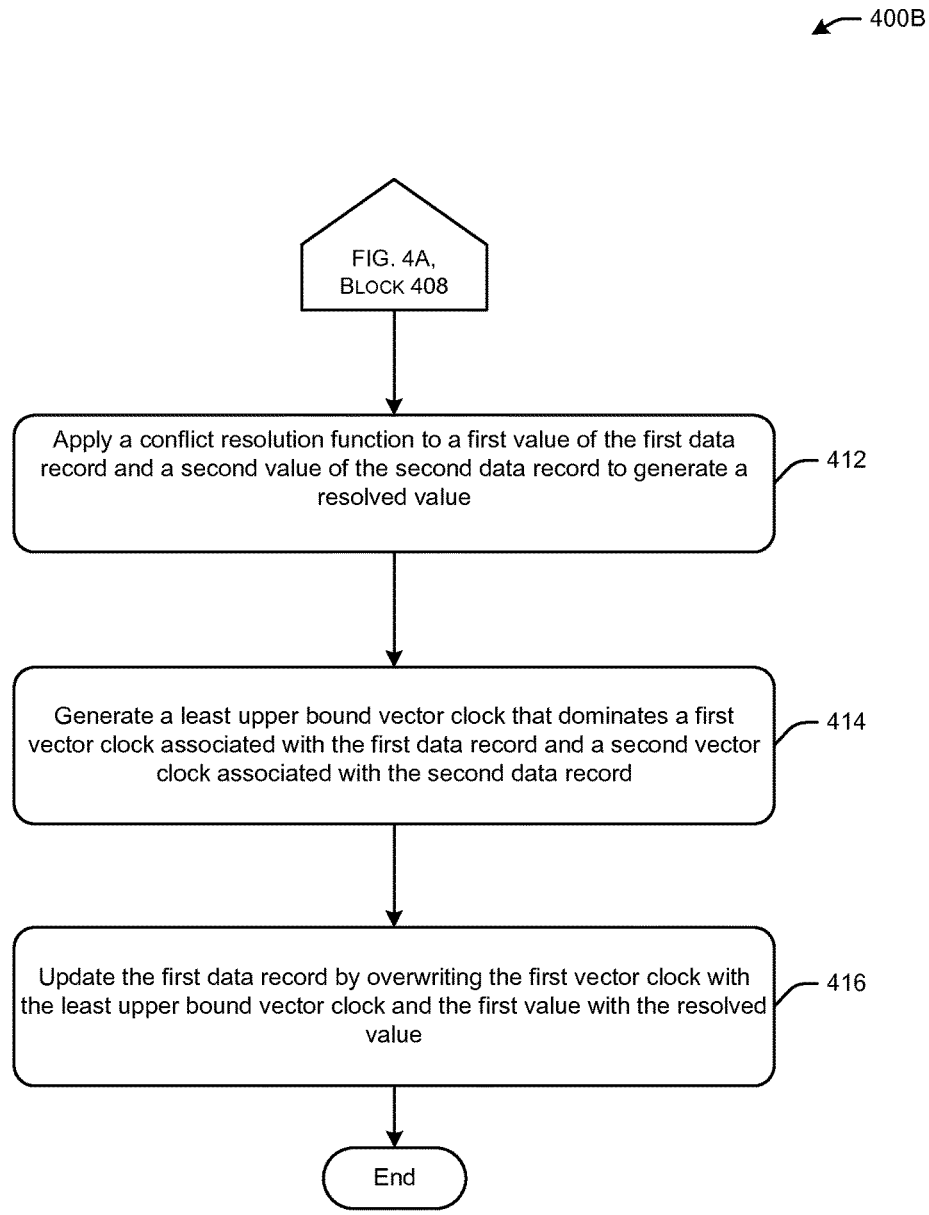
FIG. 4B is a process flow diagram of an illustrative method for resolving a conflict between data records in accordance with one or more example embodiments of the disclosure.
Figure 7:
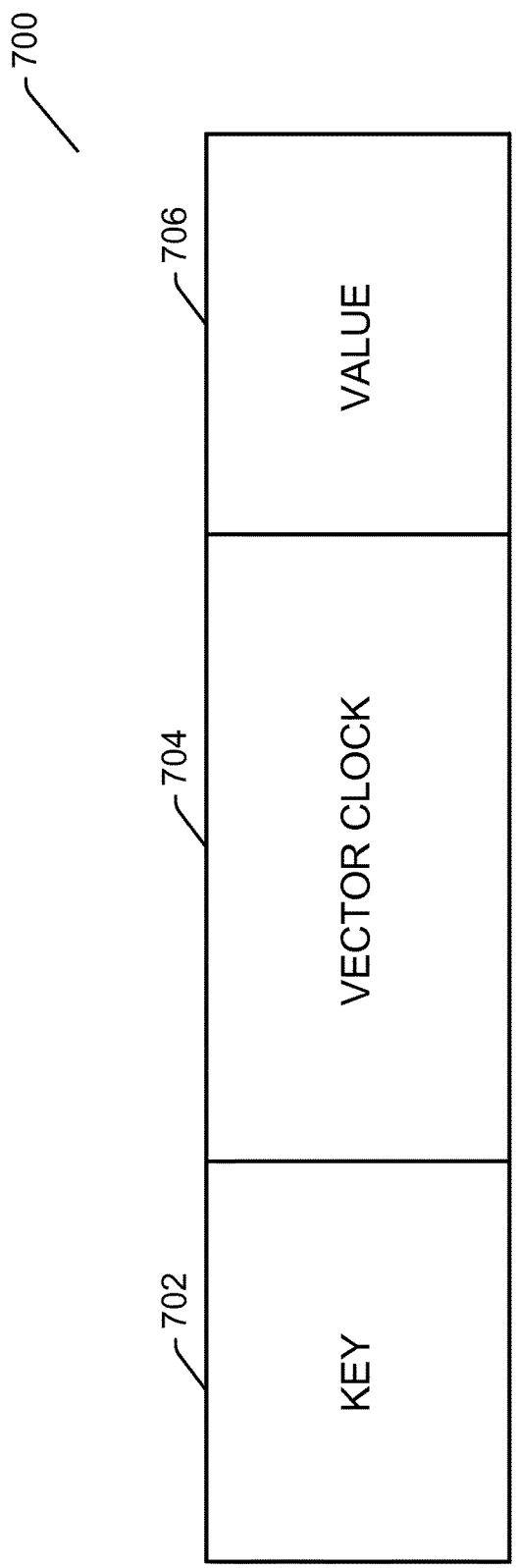
FIG. 7 is a schematic representation of an illustrative data record in accordance with one or more example embodiments of the disclosure.

FIG. 4A is a process flow diagram of an illustrative method 400A for determining whether a data record to be written to a data store conflicts with an existing stored data record in accordance with one or more example embodiments of the disclosure. FIG. 4B is a process flow diagram of an illustrative method 400B for resolving a conflict between data records in accordance with one or more example embodiments of the disclosure. The operations of methods 400A and 400B may be described hereinafter as being performed by components of a sub-system corresponding to a particular geographic region. FIG. 7 is a schematic representation of an illustrative data record in accordance with one or more example embodiments of the disclosure.

Referring now to FIG. 4A, at block 402, computer-executable instructions of the data read/write module(s) 218 may be executed to a write a first data record to a first data store (e.g., data store 106) forming at least part of a first sub-system (e.g., sub-system 124) corresponding to a first geographic region (e.g., Region N). In certain example embodiments, the first data record may be written to a first partition of a cluster of database partitions. In addition, in certain example embodiments, the operation at block 402 may be an update to the first data record.

At block 404, computer-executable instructions of the replication queue module(s) 228 may be executed to retrieve a replication message from an inbound message queue and identify a second data record contained in the replication message. The second data record may have been written to a second data store forming at least part of a second sub-system corresponding to a second geographic region.

Each of the first data record and the second data record referenced in FIG. 4A may be schematically represented in accordance with the example data record representation depicted in FIG. 7. Referring now to FIG. 7, an example data record 700 may be modeled as a tuple (k, c, v) where k may denote the data record's primary key 702, c may denote a vector clock 704 associated with the data record, and v may denote that data record's value 706. The primary key 702 may serve as an identifier of a data object to which the data record relates. The value 706 may include one or more values assigned to one or more variables representative of attributes of a data object. The vector clock 704 may be an associative array, vector, or any other suitable data structure that includes a set of one or more attribute-attribute-value pairs. For example, in certain example embodiments of the disclosure, the vector clock 704 may be represented as a JSON map as follows: {Region 1: 2, Region 2: 4, . . . , Region N: 0}.

Referring again to FIG. 4A, the operations of blocks 406-410 may be performed responsive to execution of computer-executable instructions of the conflict determination module(s) 220. In order to cause the operations of, for example, blocks 406 and 408 to be performed, the conflict determination module(s) 220 may utilize various operations defined on vector clocks. In various example embodiments, the following operations may be defined for vector clocks and/or data records: a "version" operation, an "increment" operation, a "dominates" operation, a "subsumes" operation, an "obsolete" operation, and a "conflict" operation. Each of these operations will now be described in turn.

The "version" operation may be executed to determine the version of a vector clock. The version of a vector clock may equal the maximum value of all attribute-value pairs contained in the vector clock. For example, given a vector clock c having the following JSON map: {Region 1: 1, Region 2: 2, Region 3: 2048} the version (c)=2048. The "version" operation may be formally defined as follows: version (c)=max({c[k]|k∈keys}).

The "increment" operation may perform the following sub-operations: (1) compute the version of a vector clock, and (2) replace the value for a particular attribute-value pair with the computed version. The "increment" operation may be performed responsive to initiation of a write for a particular geographic region. For example, if a sub-system corresponding to a particular geographic region updates a data record or writes a new data record, a vector clock that is stored in a data store of the sub-system and that corresponds to the data record may be incremented. Thus, the "increment" operation may receive both a vector clock and an attribute (e.g., a geographic region) as inputs. In certain example embodiments, a vector clock may only be incremented responsive to a write to a data object by a database partition that "owns" the data object, and not in response to replication of the write on one or more other partitions. As an example of the "increment" operation, given a vector clock c having the example JSON map from above ({Region 1: 1, Region 2: 2, Region 3: 2048}), inc (c, Region 1)={Region 1: 2049, Region 2: 2, Region 3: 2048}. The "increment" operation may be formally defined as inc (c, r)=c [r←version (c)+1].

The "dominates" operation may receive two vector clocks $c_1$ and $c_2$ as inputs and may generate a Boolean value indicative of whether vector clock $c_1$ dominates vector clock $c_2$. Vector clock $c_1$ may be determined to dominate vector clock $c_2$ if every vector clock entry (e.g., each value of each attribute-value pair) of clock $c_1$ is greater than or equal to a corresponding clock value in vector clock $c_2$. Vector clock sub-entries may also be referred to herein as clock values or vector clock values. For example, assume vector clocks $c_1$, $c_2$, and $c_3$ have the following respective JSON map representations: {Region 1: 1, Region 2: 2}, {Region 1: 2, Region 2: 1}, and {Region 1: 2, Region 2: 2}. Applying the "dominates" operation to each ordered pair of vector clocks $c_1$, $c_2$, and $c_3$ would yield the following results: dominates ($c_1$, $c_2$)=false; dominates ($c_2$, $c_1$)=false; dominates ($c_1$, $c_3$)=false; dominates ($c_3$, $c_1$)=true; dominates ($c_2$, $c_3$)=false; dominates ($c_3$, $c_2$)=true. The "dominates" operation may be formally defined as follows: dominates ($c_1$, $c_2$)=true iff $\forall r \in$ {geographic regions}, $c_1[r] \geq c_2[r]$.

The "subsumes," "obsolete," and "conflict" operations may be defined for data records, but may involve application of the "dominates" operation to associated vector clocks. A data record (k, $c_1$, $v_1$) subsumes a data record (k, $c_2$, $v_2$) if $c_1$ dominates $c_2$. The "subsumes" operation may be formally defined as follows: subsumes ((k, $c_1$, $v_1$), (k, $c_2$, $v_2$))=true iff dominates ($c_1$, $c_2$)=true. A data record (k, $c_1$, $v_1$) is obsolete with respect to a data record (k, $c_2$, $v_2$) if $c_2$ dominates $c_1$. The "obsolete" operation may be formally defined as follows: obsolete ((k, $c_1$, $v_1$), (k, $c_2$, $v_2$))=true iff dominates ($c_2$, $c_1$)=true. If a data record contained in a replication message is obsolete with respect to a stored record, the data record contained in the replication message may be ignored (e.g., discarded) and the stored record may remain unchanged. If, on the other hand, a data record contained in a replication message subsumes a stored data record, the stored data record may be overwritten with the data record contained in the replication message.

A data record (k, $c_1$, $v_1$) conflicts with a data record (k, $c_2$, $v_2$) if $c_1$ does not dominate $c_2$ and $c_2$ does not dominate $c_1$. Stated another way, a first data record (k, $c_1$, $v_1$) conflicts with a second data record (k, $c_2$, $v_2$) if the first data record does not subsume the second data record and the second data record does not subsume the first data record. An equivalent statement is that the first data record is not obsolete with respect to the second data record and the second data record is not obsolete with respect to the first data record. The "conflict" operation may be formally defined as follows: conflict ((k, $c_1$, $v_1$), (k, $c_2$, $v_2$))=true iff dominates ($c_2$, $c_1$)=false and dominates ($c_1$, $c_2$)=false. As an example, assume the following data records: $DR_1$=("custID1234", {Region 1: 1, Region 2: 0}, {name: "The Vish", age: 33}) and $DR_2$=("custID1234", {Region 1: 0, Region 2: 1}, {name: "The Vish", age: 34}). $DR_1$ and $DR_2$ conflict with each other because the vector clock of $DR_1$ ({Region 1: 1, Region 2: 0}) does not dominate the vector clock of $DR_2$, and vice versa. If a data record contained in a replication message conflicts with a stored data record, the data record contained in the replication message may not be capable of being processed, and one or more conflict resolution operations may be executed to generate, among other things, a resolved value with which to update a value of the stored data record.

Referring again to FIG. 4A, at block 406, computer-executable instructions of the conflict determination module(s) 220 may be executed to determine whether the second data record is obsolete (e.g., whether a first vector clock associated with the first data record dominates a second vector clock associated with the second data record). In response to a positive determination at block 406, the method 400A may end. On the other hand, in response to a negative determination at block 406, the method 400A may proceed to block 408 where computer-executable instructions of the conflict determination module(s) 220 may be executed to determine whether the second data record subsumes the first data record (e.g., whether the second vector clock dominates the first vector clock). In response to a positive determination at block 408, the method 400A may proceed to block 410 where computer-executable instructions of the data read/write module(s) 218 may be executed to overwrite the first data record with the second data record. Overwriting the first data record with the second data record may include overwriting the first vector clock with the second vector clock and overwriting a first value of the first data record with a second value of the second data record. On the other hand, responsive to a negative determination at block 408, the method 400A may proceed to block 412 of method 400B depicted in FIG. 4B.

A negative determination at block 408 may indicate that the second data record is not obsolete with respect to the first data record and that the second data record does not subsume the first data record, and thus, may indicate that the second data record conflicts with the first data record. The operations of method 400B may therefore be performed to resolve a conflict between two data records which have been determined to conflict with each other.

Referring now to FIG. 4B, at block 412, computer-executable instructions of the conflict resolution module(s) 222 may be executed to apply a conflict resolution function to a first value of the first data record and a second value of the second data record to generate a resolved value. The conflict resolution function may satisfy an associative property and a commutative property. The commutative and associative properties for the conflict resolution function may be formally defined as follows, respectively: given a conflict resolution function $f$. $V \times V \rightarrow V \Rightarrow \forall x, y \in V f(x, y) = f(y, x)$ and $\forall x, y, z \in V f(x, f(y, z)) = f(f(x,y), z)$.

At block 414, computer-executable instructions of the conflict resolution module(s) 222 may be executed to generate a new vector clock that dominates a first vector clock associated with the first data record and a second vector clock associated with the second data record. In certain example embodiments, the new vector clock may represent the least upper bound of the first vector clock and the second vector clock (e.g., a vector clock having the smallest clock values that dominate corresponding clock values of the first vector clock and the second vector clock). For example, if the first vector clock has the JSON map representation {Region 1: 1, Region 2: 0} and the second vector clock has the JSON map representation {Region 1: 0, Region 2: 1}, the vector clock generated at block 414 may be the following: {Region 1: 1, Region 2: 1}.

In certain example embodiments, the operations of blocks 412 and 414 may be performed as part of a "resolve" operation. The "resolve" operation may receive the first data record, the second data record, and the conflict resolution function as inputs and may generate a resolved data record that is associated with the least upper bound vector clock generated at block 414 and the resolved value generated at block 412. The "resolve" operation may be formally defined as follows: resolve $((k, c_1, v_1), (k, c_1, v_1), f) = (k, \{r: \max c_1[r], c_2[r]) | r \in \{\text{geographic regions}\}\}, f(v_1, v_2))$.

Still referring to FIG. 4B, at block 416, computer-executable instructions of the data read/write module(s) 218 may be executed to update the first data record by overwriting the first vector clock with the least upper bound vector clock and the first value with the resolved value.

In certain example embodiments, the generation of a least upper bound vector clock as defined by the "resolve" operation and the application of a conflict resolution function that satisfies the commutative and associative properties may ensure, at least in part, eventual consistency between different geographic regions, or in other words, that the final at-rest value for any given key (data record) will be identical in all geographic regions, and further, that the final at-rest value will have accounted for any concurrent updates made to the key in other geographic regions. In certain example embodiments, if a least upper bound clock is not generated as part of the execution of the resolve operation in a particular geographic region (e.g., the new vector clock that is generated includes at least one clock entry that is greater than the maximum value of corresponding clock entries from the first vector clock and second vector clock described above), then a concurrent update generated in a different geographic region may be treated as obsolete in the particular geographic region and may not be replicated, and as such, data consistency across geographic regions may not be attained. Deterministic data replication may also be achieved if the conflict resolution function arrives at the same resolved value regardless of the order in which concurrent updates made to a data object in different geographic regions occur. A conflict resolution function $f$ may achieve a deterministic result if given any two processes that modify a data object (which may be modeled as functions g: $V \to V$ and h: $V \to V$) then $\forall x \in V f(g(x), h(x)) = g(h(x)) = h(g(x))$.

Figure 5:
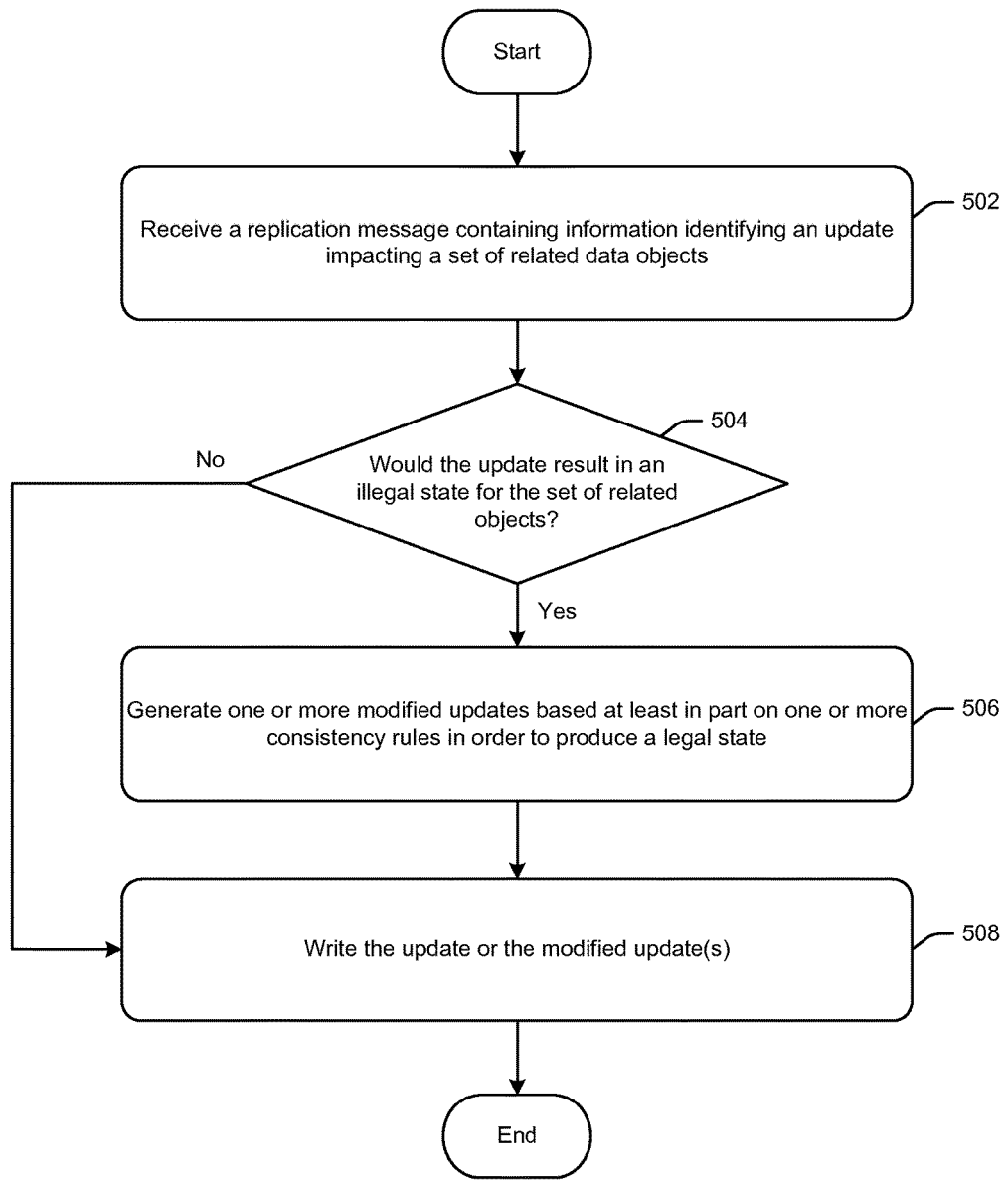
FIG. 5 is a process flow diagram of an illustrative method for resolving an illegal state for a set of data objects through the application of consistency rules in accordance with one or more example embodiments of the disclosure.

FIG. 5 is a process flow diagram of an illustrative method 500 for resolving an illegal state for a set of data records through the application of consistency rules in accordance with one or more example embodiments of the disclosure.

At block 502, computer-executable instructions of the replication queue module(s) 228 may be executed to receive, from an inbound replication queue, a replication message containing information identifying an update impacting a set of related objects.

As an illustrative and non-limiting example, assume that a first user (Bob) accesses a social networking platform from a first geographic region (North America (NA)) and a second user (Yasmin) accesses the social networking platform from a second geographic region (Europe (EU)). Bob and Yasmin may be represented by respective data objects (which may be referred to hereinafter as "nodes"). Assume that Bob sends a "friend request" to Yasmin, which may be represented as a "friend request" edge between the Bob node and the Yasmin node. Further, assume that the "friend request" edge has been replicated to both the NA region and the EU region. Thus, in an initial state, the Bob node, the Yasmin node, and the "friend request" edge are stored in a data store associated with the NA region and a data store associated with the EU region.

Now assume that both Bob and Yasmin make the follow updates concurrently: (1) Bob decides to block Yasmin, and (2) Yasmin accepts Bob's friend request. Initially, the "friend request" edge may be deleted in both the NA region and the EU region, and a "blocked" edge may be generated between the Bob node and the Yasmin node in the NA region and a "friends" edge may be generated between the Bob node and the Yasmin node in the EU region. Thus, the Bob and Yasmin nodes may have different local states in the NA region and the EU region.

At block 504, computer-executable instructions of the consistency rules enforcement module(s) 224 may be executed to determine whether replication of the update identified in the replication message would result in an illegal state. For example, if we assume that the replication message received at block 502 is received from the EU region and contains information identifying the "friends" edge between the Bob and Yasmin nodes, a determination may be made at block 504 whether replication of the update included in the replication message (e.g., generation of the "friends" edge between the Bob and Yasmin nodes) would result in an illegal state in the NA region.

The determination at block 504 may be made based on an application of one or more consistency rules 236. Referring again to the illustrative and non-limiting example introduced above, an evaluation of consistency rules may indicate that the presence of both a "blocked" edge and a "friends" edge between the Bob and Yasmin nodes indicates an illegal state. In this example, the set of related objects may include, for example, the Bob node, the Yasmin node, the "deleted friends request" edge, the "blocked" edge, and the "friends" edge.

In response to a positive determination at block 504, computer-executable instructions of the consistency rules enforcement module(s) 508 may be executed, at block 506, to generate one or more modified updates based at least in part on the one or more consistency rules in order to produce a legal state for the set of related data objects. For example, a consistency rule may indicate that a "blocked" edge takes precedence over a "friends" edge in order to protect a user's privacy, and thus, the "friends" edge may be deleted. As another illustrative and non-limiting example, if a pending "friend request" edge exists in both direction between two user nodes, a consistency rule may dictate that the edges be deleted and replaced with a "friend" edge. It should be appreciated that the above examples of consistency rules are merely illustrative and not exhaustive.

At block 508, the modified update(s) generated at block 506 may be written. Alternatively, in response to a negative determination at block 504, the update contained in the replication message may be written because it has been determined that the update would not result in an illegal state for the set of related objects.

Figure 6:
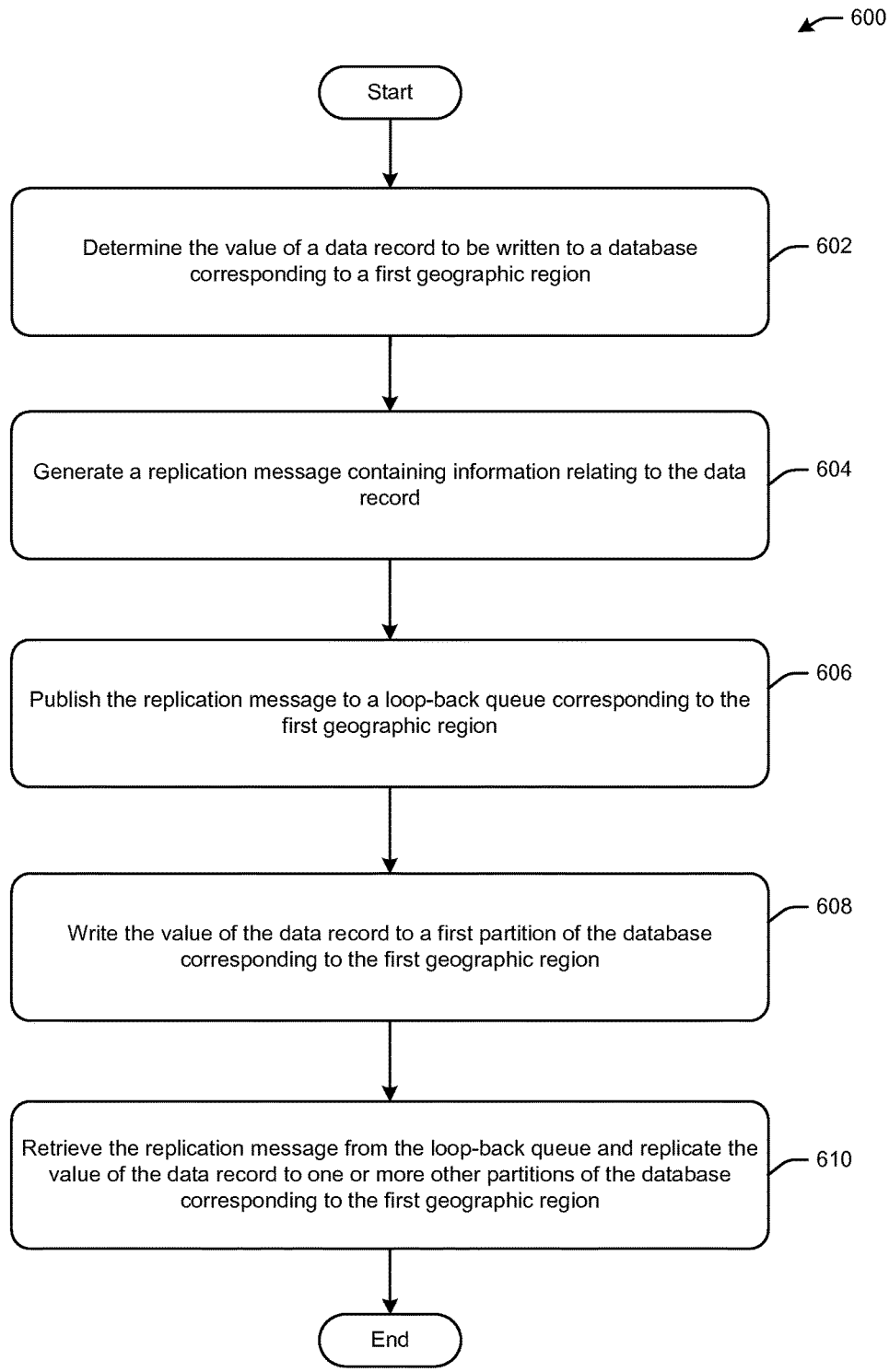
FIG. 6 is a process flow diagram of an illustrative method for utilizing a loop-back queue to facilitate replication of data record updates within a geographic region in accordance with one or more example embodiments of the disclosure.

FIG. 6 is a process flow diagram of an illustrative method 600 for utilizing a loop-back queue to facilitate replication of data record updates within a geographic region in accordance with one or more example embodiments of the disclosure.

At block 602, computer-executable instructions of the data read/write module(s) 218 may be executed to determine the value of a data record to be written to a database corresponding to a first geographic region.

At block 604, computer-executable instructions of the replication queue module(s) 228 may be executed to generate a replication message containing information relating to the data record to be written. The replication message may include an identifier of the data record (e.g., a key), a vector clock associated with the data record, and the value determined at block 302. The information included in the replication message may further include key(s), vector clocks, and optionally values associated with one or more other data records related to the data record to be written. Such other data records may include data records evaluated as part of the application of consistency rules.

At block 606, computer-executable instructions of the publisher module(s) 226 may be executed to publish the replication message generated at block 604 to a loop-back queue corresponding to the first geographic region.

At block 608, computer-executable instructions of the data read/write module(s) 218 may be executed to write the value of the data record to a first database partition of a cluster of database partitions corresponding to the first geographic region. The database cluster may form at least part of a data store (e.g., data store 106) which, in turn, may form at least part of a sub-system (e.g., sub-system 124) corresponding to a particular geographic region (e.g., Region N). Writing the value determined at block 602 may correspond to an update to an existing data record.

At block 610, computer-executable instructions of the replication queue module(s) 228 may be executed to retrieve the replication message from the loop-back queue. Computer-executable instructions of the data read/write module(s) 218 may then be executed to replicate the value of the data record to one or more other database partitions in the cluster. The number of other database partitions to which the data record value may be replicated may be determined based on a desired level of redundancy. Any suitable protocol (e.g., a gossip protocol) may be employed to replicate the data record to one or more other partitions.

One or more operations of the methods 300-600 may have been described above as being performed by a computing device 202, or more specifically, by one or more program modules, applications, or the like executing on a computing device 202. It should be appreciated, however, that any of the operations of any of the methods 300-600 may be performed by one or more other components of a sub-system corresponding to a geographic region. In addition, it should be appreciated that processing performed in response to execution of computer-executable instructions provided as part of an application, program module, or the like may have been interchangeably described as being performed by the application or the program module itself, by a device on which the application, program module, or the like is executing, or by a system that includes such a device. While the operations of the methods 300-600 may have been described in the context of the illustrative architecture 100 and the illustrative computing device 202 having the illustrative configuration depicted in FIG. 2, it should be appreciated that such operations may be implemented in connection with numerous other architectural and device level configurations.

The operations described and depicted in the illustrative methods of FIGS. 3-6 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 3-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method, comprising:
   determining that a first key that uniquely identifies a first data record stored in a first data store corresponding to a first geographic region is equivalent to a second key that uniquely identifies a second data record stored in a second data store corresponding to a second geographic region, wherein data record updates are only communicated between the first geographic region and the second geographic region using one or more messaging queues;
   identifying a first meta clock contained in the first data record and a second meta clock contained in the second data record, wherein the first meta clock includes a first vector clock value and a second vector clock value, wherein the second meta clock includes a third vector clock value and a fourth vector clock value, wherein the first vector clock value and the third vector clock value are for the first geographic region, and wherein the second vector clock value and the fourth vector clock value are for the second geographic region;
   determining, by one or more computers comprising one or more processors, that a conflict exists between the first data record and the second data record based on a comparison of the first meta clock and the second meta clock, wherein the conflict is caused, at least in part, by an occurrence of an update to the first data record prior to receipt, at the first data store, of an update to the second data record stored in the second data store;
   resolving, by the one or more computers, the conflict between the first data record and the second data record by:
      generating a least upper bound meta clock that dominates the first meta clock and the second meta clock by determining a fifth vector clock value that is greater than or equal to the first vector clock value and the third vector clock value, and by determining a sixth vector clock value that is greater than or equal to the second vector clock value and the fourth vector clock value, and
      applying a conflict resolution function to select one of a first value contained in the first data record or a second value contained in the second data record as a resolved value; and
   modifying, by the one or more computers, the first data record by:

replacing the first value with the resolved value,
replacing the first vector clock value with the fifth vector clock value, and
replacing the second vector clock value with the sixth vector clock value.

2. The method of claim 1, wherein generating the least upper bound meta clock comprises:
identifying the first vector clock value of the first meta clock and the third vector clock value of the second meta clock, and wherein the first vector clock value is greater than the third vector clock value;
identifying the second vector clock value of the first meta clock and the fourth vector clock value of the second meta clock, wherein the fourth vector clock value is greater than the second vector clock value;
associating, by the one or more computers, the first vector clock value with the first region in the least upper bound meta clock; and
associating, by the one or more computers, the fourth vector clock value with the second region in the least upper bound meta clock.

3. The method of claim 1, further comprising:
communicating the modified first data record to the second data store via at least one of the one or more message queues to ensure data consistency between the modified first data record and the second data record.

4. The method of claim 3, wherein the first data store comprises a plurality of partitions, and wherein the first data record is written to a first partition and a second partition of the plurality of partitions, the method further comprising:
generating a replication message comprising the modified data record;
publishing, by the one or more computers, the replication message to a loop-back message queue;
retrieving the replication message from the loop-back message queue; and
modifying, by the one or more computers, the first data record written to the second partition based at least in part on the modified data record contained in the replication message.

5. A method, comprising:
storing a first data record in a first data store for a first geographic region, wherein the first data record includes at least a first vector clock, and wherein the first vector clock includes at least a first vector clock value and a second vector clock value;
receiving a second data record stored in a second data store for a second geographic region, wherein the second data record includes at least a second vector clock, and wherein the second vector clock includes at least a third vector clock value and a fourth vector clock value;
determining that the second data record is for the first data record;
determining, by one or more computers comprising one or more processors, that the second data record conflicts with the first data record;
performing, by the one or more computers, one or more conflict resolution operations comprising:
determining a resolved value based at least in part on a first value associated with the first data record and a second value associated with the second data record, and
determining a least upper bound vector clock based at least in part on the first vector clock and the second vector clock by determining a fifth vector clock value that is greater than or equal to the first vector clock value and the third vector clock value, and by determining a sixth vector clock value that is greater than or equal to the second vector clock value and the fourth vector clock value; and
modifying, by the one or more computers and at least partially based on the first data record, the first data record by:
replacing the first value with the resolved value;
replacing the first vector clock value with the fifth vector clock value; and
replacing the second vector clock value with the sixth vector clock value; and
storing the fifth vector clock value and the sixth vector clock value.

6. The method of claim 5, wherein determining that the second data record conflicts with the first data record comprises determining that the first vector clock does not dominate the second vector clock and determining that the second vector clock does not dominate the first vector clock.

7. The method of claim 6, wherein the first vector clock value and the third vector clock value are for one of the first geographic region, the second geographic region, a third geographic region, or a fourth geographic region, wherein the second vector clock value and the fourth vector clock value are for a different region from among one of the first geographic region, the second geographic region, the third geographic region, or the fourth geographic region, and wherein determining that the first vector clock does not dominate the second vector clock comprises determining that the first vector clock value is less than the third vector clock value and determining that the second vector clock does not dominate the first vector clock comprises determining that the fourth vector clock value is less than the second vector clock value.

8. The method of claim 5, wherein storing the first data record in the first data store comprises performing a first update comprising:
storing the first value in the first data store in association with a key;
incrementing a first existing vector clock stored in the first data store in association with the key to generate the first vector clock; and
deleting one or more values of the first existing vector clock and storing one or more values of the first vector clock.

9. The method of claim 8, wherein the second data record is generated as a result of a second update comprising:
storing the second value in the second data store in association with the key;
incrementing a second existing vector clock stored in the second data store in association with the key to generate the second vector clock; and
deleting one or more values of the second existing vector clock and storing one or more values of the second vector clock.

10. The method of claim 9, wherein the first update and the second update occur prior to at least one receipt of the first update at the second data store or receipt of the second update at the first data store.

11. The method of claim 10, wherein applying the one or more conflict resolution operations generates the resolved value regardless of an order in which the first update and the second update occur.

12. The method of claim 5, wherein applying the one or more conflict resolution operations comprises providing the first value and the second value as inputs to a conflict resolution function to generate the resolved value.

13. The method of claim 12, wherein the conflict resolution function satisfies an associative property and a commutative property.

14. The method of claim 5, further comprising:
 receiving an update;
 determining, by the one or more computers and based at least in part on an evaluation of one or more consistency rules, that the update would result in an illegal state for a set of data records comprising the modified first data record and one or more other data records;
 modifying, by the one or more computers, the update to generate a modified update that would result in a legal state for the set of data records; and
 storing the update.

15. The method of claim 5, wherein the first data store comprises a plurality of partitions, wherein the first data record is replicated in at least two of the plurality of partitions, and wherein the first vector clock has only one respective vector clock value for each of the first geographic region and the second geographic region.

16. The method of claim 5, wherein data record updates are only communicated between the first data store and the second data store via one or more message queues.

17. A system, comprising:
 at least one memory storing computer-executable instructions; and
 at least one processor communicatively coupled to the at least one memory and configured to access the at least one memory and execute the computer-executable instructions to:
  identify a current value and a first vector clock associated with the current value, wherein the current value and the first vector clock are stored in a first data store in association with a key that identifies a data object, wherein the first vector clock includes at least a first vector clock value and a second vector clock value;
  receive an updated value and a second vector clock associated with the updated value, wherein the updated value and the second vector clock are stored in a second data store in association with the key, wherein data record updates are only communicated between the first data store and the second data store via one or more message queues, and wherein the second vector clock includes at least a third vector clock value and a fourth vector clock value;
  perform a comparison of the first vector clock and the second vector clock by comparing at least the first vector clock value to the third vector clock value, and comparing the second vector clock value to the fourth vector clock value; and
  modify a first data record by performing at least one of: modifying the updated value, replacing the current value with the updated value, or determining a resolved value and a third vector clock with a fifth vector clock value and a sixth vector clock value, replacing the current value with the resolved value, replacing the first vector clock value with the fifth vector clock value, and replacing the second vector clock value with the sixth vector clock value, wherein the third vector clock is a least upper bound clock of the first vector clock and the second vector clock, wherein the fifth vector clock value is greater than or equal to the first vector clock value and the third vector clock value, and wherein the sixth vector clock value is greater than or equal to the second vector clock value and the fourth vector clock value.

18. The system of claim 17, wherein the at least one processor is configured to perform a comparison of the first vector clock and the second vector clock by executing the computer-executable instructions to:
 determine that the first vector clock dominates the second vector clock by determining that the first vector clock value is greater than or equal to the third vector clock value, and the second vector clock value is greater than or equal to the fourth vector clock value,
 wherein the modifying comprises deleting the updated value.

19. The system of claim 17, wherein the at least one processor is configured to perform a comparison of the first vector clock and the second vector clock by executing the computer-executable instructions to:
 determine that the second vector clock dominates the first vector clock by determining that the third vector clock value is greater than or equal to the first vector clock value, and that the fourth vector clock value is greater than or equal to the second vector clock value,
 wherein the modifying comprises replacing the current value with the updated value.

20. The system of claim 17, wherein the at least one processor is configured to perform a comparison of the first vector clock and the second vector clock by executing the computer-executable instructions to:
 determine that the second vector clock conflicts with the first vector clock by determining that the third vector clock value is less than the first vector clock value, and that the second vector clock value is less than the fourth vector clock value,
 wherein the modifying comprises generating the resolved value and the third vector clock and replacing the current value with the resolved value, replacing the first vector clock value with the fifth vector clock value, and replacing the second vector clock value with the sixth vector clock value.

* * * * *